(12) United States Patent
Ding et al.

(10) Patent No.: US 12,510,713 B2
(45) Date of Patent: Dec. 30, 2025

(54) WAVELENGTH SELECTIVE SWITCH

(71) Applicant: HUAWEI TECHNOLOGIES CO., LTD., Guangdong (CN)

(72) Inventors: Bifeng Ding, Wuhan (CN); Ying Shangguan, Wuhan (CN); Yonghong Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 17/852,690

(22) Filed: Jun. 29, 2022

(65) Prior Publication Data

US 2023/0003955 A1    Jan. 5, 2023

Related U.S. Application Data

(63) Continuation of application No. PCT/CN2019/130891, filed on Dec. 31, 2019.

(51) Int. Cl.
*G02B 6/293* (2006.01)
*G02B 6/35* (2006.01)
*G02B 6/42* (2006.01)

(52) U.S. Cl.
CPC ........ *G02B 6/2931* (2013.01); *G02B 6/29311* (2013.01); *G02B 6/2938* (2013.01); *G02B 6/356* (2013.01); *G02B 6/4215* (2013.01)

(58) Field of Classification Search
CPC .......... G02B 6/293–29398; G02B 6/30; G02B 6/35–3598; G02B 6/42–43;
(Continued)

(56) References Cited

U.S. PATENT DOCUMENTS 6,529,670 B1  3/2003  Saito et al.
6,748,156 B2  6/2004  Saito et al.
(Continued)

FOREIGN PATENT DOCUMENTS

CN   104122622 A   10/2014
CN   105359010 A    2/2016
(Continued)

OTHER PUBLICATIONS

International Search Report and Written Opinion issued in PCT/CN2019/130891, dated Sep. 21, 2020, 9 pages.
(Continued)

*Primary Examiner* — Daniel Petkovsek

(57) ABSTRACT

A wavelength selective switch includes an optical fiber array, a multiplexing/demultiplexing component, and a transmission direction adjustment component. The optical fiber array includes a first optical fiber and at least one second optical fiber. The first offset is used to compensate for a second offset of a diffraction spectrum generated when a plurality of single-wavelength optical signals obtained after an optical input signal is processed by the multiplexing/demultiplexing component arrive at the transmission direction adjustment component, so that the second offset of the diffraction spectrum of the plurality of single-wavelength optical signals arriving at the transmission direction adjustment component is 0 or may be ignored. An optical system has a simple structure, and no optical element needs to be added. This increases optical design freedom, facilitates optical path system commissioning, and reduces reliability risks and costs of subsequent products.

15 Claims, 12 Drawing Sheets

(58) Field of Classification Search
CPC ........... H04J 14/0212; H04Q 11/00–08; H04Q 2011/0007–0098
See application file for complete search history.

(56) References Cited

U.S. PATENT DOCUMENTS

| | | | |
|---|---|---|---|
| 9,046,657 B2* | 6/2015 | Stewart | G02B 6/29397 |
| 9,521,473 B2* | 12/2016 | Wagener | H04Q 11/0005 |
| 9,581,878 B2* | 2/2017 | Xie | G02F 1/295 |
| 2003/0095776 A1 | 5/2003 | Saito et al. | |
| 2005/0244098 A1* | 11/2005 | Barrett | G02F 1/011 |
| | | | 385/24 |
| 2006/0067611 A1* | 3/2006 | Frisken | G02B 6/2793 |
| | | | 385/16 |
| 2009/0285533 A1* | 11/2009 | Hiroi | G02B 6/3664 |
| | | | 385/65 |
| 2010/0046884 A1 | 2/2010 | Presley et al. | |
| 2013/0163921 A1 | 6/2013 | Matsumoto et al. | |
| 2013/0177272 A1 | 7/2013 | Stewart et al. | |
| 2014/0023316 A1 | 1/2014 | Mclaughlin | |
| 2014/0186038 A1 | 7/2014 | Frisken et al. | |
| 2015/0208143 A1* | 7/2015 | Frisken | H04Q 11/0005 |
| | | | 398/48 |
| 2017/0299858 A1* | 10/2017 | Zong | G02B 6/3548 |
| 2021/0088721 A1* | 3/2021 | Cai | G02B 6/3664 |
| 2021/0278596 A1* | 9/2021 | Mao | H04Q 11/0005 |

FOREIGN PATENT DOCUMENTS

| | | |
|---|---|---|
| CN | 107367796 A | 11/2017 |
| CN | 109845150 A | 6/2019 |
| JP | 2000193846 A | 7/2000 |
| JP | 2001074980 A | 3/2001 |
| JP | 3446953 B2 | 9/2003 |
| JP | 4128704 B2 | 7/2008 |
| WO | 2018104725 A1 | 6/2018 |

OTHER PUBLICATIONS

Extended European Search Report issued in EP19958162.0, dated Nov. 18, 2022, 10 pages.

* cited by examiner

WAVELENGTH SELECTIVE SWITCH

CROSS-REFERENCE TO RELATED DISCLOSURES

This application is a continuation of International Application No. PCT/CN2019/130891, filed on Dec. 31, 2019, the disclosure of which is hereby incorporated by reference in its entirety.

TECHNICAL FIELD

This application relates to optical communications technologies, and in particular, to a wavelength selective switch (WSS).

BACKGROUND

A WSS is a key component of a reconfigurable optical add-drop multiplexer (ROADM) device. The WSS features a wide frequency band and low dispersion, and supports a port irrespective of a wavelength. To be specific, any port of the WSS can transmit an optical signal of any wavelength and supports a higher dimension. The dimension refers to a maximum quantity of connection directions that the ROADM device can provide. Therefore, the WSS has become a mainstream technology of ROADM.

Currently, the WSS is mainly implemented by using free space multiplexing/demultiplexing technologies based on a diffraction grating and optical switching technologies based on a micro-electro-mechanical system (MEMS), a liquid crystal on silicon (LCOS), a liquid crystal, and the like. Regardless of what optical switching technology is used, the WSS needs to use the diffraction grating for spatial multiplexing/demultiplexing. When a beam is incident to the diffraction grating, an incident angle exists in a dispersion direction of the grating, and an azimuth may also exist in a height direction of the beam. The azimuth causes an offset of a diffraction spectrum in the dispersion direction, and finally causes a system center wavelength offset. In the conventional technology, a combined lens is usually added to an optical path of a WSS to perform aberration compensation, so as to eliminate an offset of a diffraction spectrum.

However, according to the method in the conventional technology, a quantity of lenses in the WSS is increased. Consequently, a structure of an optical path system is complex, a length of the optical path system is increased, and optical design freedom is reduced.

SUMMARY

This application provides a wavelength selective switch, to compensate for an offset of a diffraction spectrum in the wavelength selective switch.

A first aspect of this application provides a wavelength selective switch, including an optical fiber array, a multiplexing/demultiplexing component, and a transmission direction adjustment component. The optical fiber array includes a first optical fiber and at least one second optical fiber, and is configured to receive an optical input signal transmitted by a light source. The multiplexing/demultiplexing component is configured to split the optical input signal into a plurality of single-wavelength optical signals in space. The transmission direction adjustment component is configured to separately change transmission directions of the plurality of single-wavelength optical signals. The optical fiber array is further configured to output an optical output signal. The optical output signal is a signal obtained after the optical input signal is processed by an optical component in the wavelength selective switch.

Fiber cores of a plurality of optical fibers in the optical fiber array are distributed in a curve in a height direction of the wavelength selective switch. The first optical fiber is used as a reference. A fiber core of each of the at least one second optical fiber has a first offset relative to a fiber core of the first optical fiber in the height direction of the wavelength selective switch, and the first offset is used to compensate for a second offset of a diffraction spectrum generated when the plurality of single-wavelength optical signals obtained after the optical input signal is processed by the multiplexing/demultiplexing component arrive at the transmission direction adjustment component.

In this manner, the fiber core of the second optical fiber in the optical fiber array offsets relative to a first port in the height direction, so that an offset of the diffraction spectrum can be compensated for. An optical system has a simple structure, and no optical element needs to be added. This increases optical design freedom, facilitates optical path system commissioning, and reduces reliability risks and costs of subsequent products.

Optionally, the first optical fiber is an optical fiber whose second offset is the smallest or whose second offset is 0 in the optical fiber array.

Optionally, the first optical fiber is any optical fiber other than an optical fiber whose second offset is the smallest or whose second offset is 0 in the optical fiber array, the fiber core of the first optical fiber has a third offset relative to a fiber core of the optical fiber whose second offset is the smallest or whose second offset is 0, and a second offset corresponding to the second optical fiber is equal to a sum of the first offset and the third offset.

Optionally, the wavelength selective switch further includes a beam shaping and polarization splitting component, a curved reflector, and a cylindrical lens. The beam shaping and polarization splitting component is configured to collimate and shape the optical input signal, split a shaped beam into beams in orthogonal polarization states, and convert the beams in the orthogonal polarization states into two beams in a same polarization direction: a first beam and a second beam. The curved reflector is configured to collimate and converge the first beam and the second beam in a dispersion direction, and send the first beam and the second beam to the cylindrical lens. The cylindrical lens is configured to collimate and converge the first beam and the second beam in the height direction, and send the first beam and the second beam to the multiplexing/demultiplexing component.

Optionally, the multiplexing/demultiplexing component is a reflective grating component, and the transmission direction adjustment component is a micro-electro-mechanical system (MEMS) reflector or a liquid crystal on silicon (LCOS). Correspondingly, the reflective grating component is configured to diverge a received beam into a plurality of single-wavelength optical signals along the dispersion direction, where the plurality of single-wavelength optical signals are processed by the cylindrical lens and the curved reflector and then arrive at the micro-electro-mechanical system (MEMS) reflector or the liquid crystal on silicon (LCOS). The MEMS reflector or the liquid crystal on silicon (LCOS) is configured to change transmission directions of the plurality of single-wavelength optical signals, and the plurality of single-wavelength optical signals whose directions are changed return along original optical paths to form the optical output signal.

Optionally, the multiplexing/demultiplexing component is a transmissive grating component, and the transmission direction adjustment component is a micro-electro-mechanical system (MEMS) reflector or a liquid crystal on silicon (LCOS). Correspondingly, the transmissive grating component is configured to diverge a received beam into a plurality of single-wavelength optical signals along the dispersion direction, where the plurality of single-wavelength optical signals are transmitted to the micro-electro-mechanical system (MEMS) reflector or the liquid crystal on silicon (LCOS). The MEMS reflector or the liquid crystal on silicon (LCOS) is configured to change transmission directions of the plurality of single-wavelength optical signals, and the plurality of single-wavelength optical signals whose directions are changed return along original optical paths to form the optical output signal.

Optionally, the reflective grating component includes a prism and a diffraction grating.

Optionally, the fiber cores of the first optical fiber and the at least one second optical fiber are distributed in an arc shape in the height direction of the wavelength selective switch.

Optionally, a first distance between a fiber core of an optical fiber at a topmost or bottommost location in the optical fiber array and a fiber core of a neighboring optical fiber is not equal to a second distance between fiber cores of neighboring optical fibers in remaining optical fibers, and second pitches between the fiber cores of the neighboring optical fibers in the remaining optical fibers are equal.

A second aspect of this application provides a ROADM device. The ROADM device includes at least one wavelength selective switch provided in any one of the first aspect or the optional manners.

Each of the at least one wavelength selective switch provided in this embodiment includes an optical fiber array, a multiplexing/demultiplexing component, and a transmission direction adjustment component. The optical fiber array includes a first optical fiber and at least one second optical fiber. A first offset is set for a fiber core of each of the at least one second optical fiber relative to a fiber core of the first optical fiber in a height direction. The first offset is used to compensate for a second offset of a diffraction spectrum generated when a plurality of single-wavelength optical signals obtained after an optical input signal is processed by the multiplexing/demultiplexing component arrive at the transmission direction adjustment component, so that the second offset of the diffraction spectrum of the plurality of single-wavelength optical signals arriving at the transmission direction adjustment component is 0 or may be ignored. In this manner, the fiber core of the second optical fiber in the optical fiber array offsets relative to the fiber core of the first optical fiber in the height direction, so that the offset of the diffraction spectrum can be compensated for. An optical system has a simple structure, and no optical element needs to be added. This increases optical design freedom, facilitates optical path system commissioning, and reduces reliability risks and costs of subsequent products.

DESCRIPTION OF EMBODIMENTS

In this application, the terms "first", "second", and so on are intended to distinguish between similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "have" and any other variants mean to cover the non-exclusive inclusion, so that a process, method, system, product, or device that includes a series of units is not necessarily limited to those units, but may include other units not expressly listed or inherent to such a process, method, product, or device.

Figure 1:
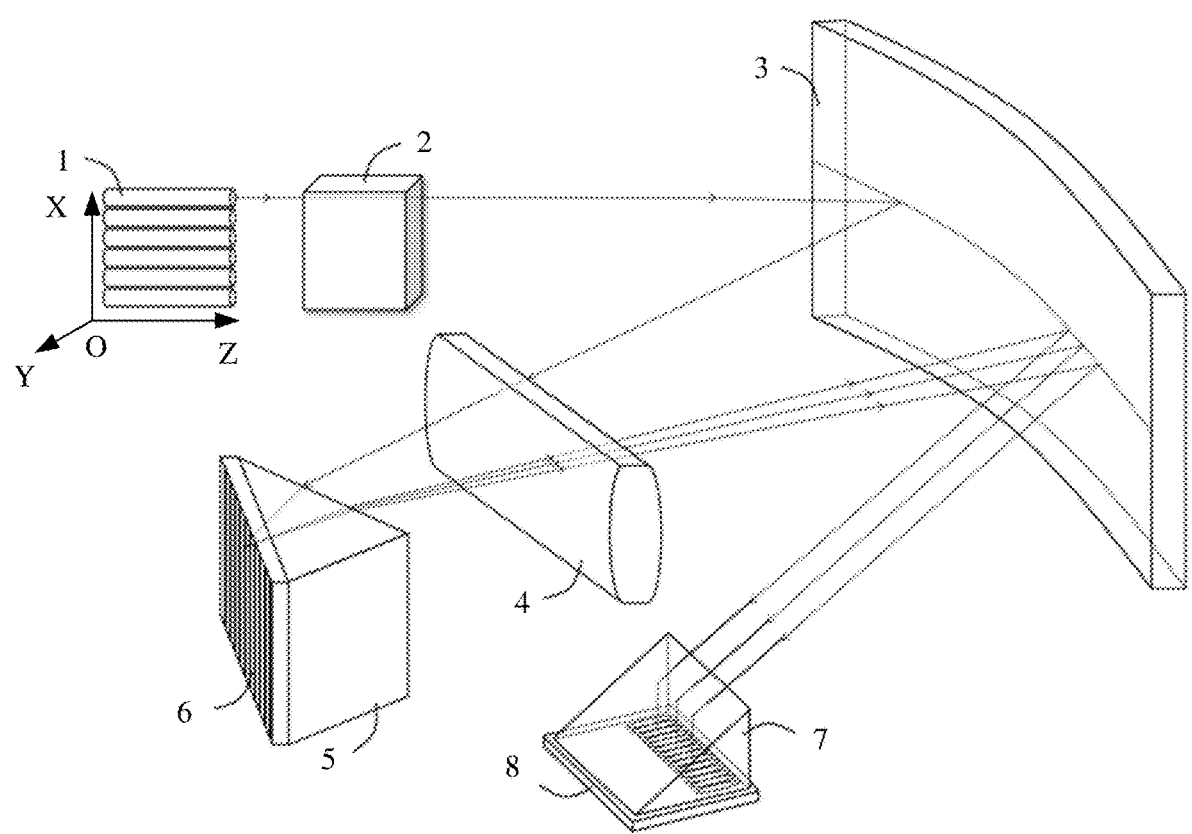
FIG. 1 is a main view of a schematic diagram of an existing WSS based on an LCOS optical switching technology.
Figure 2:
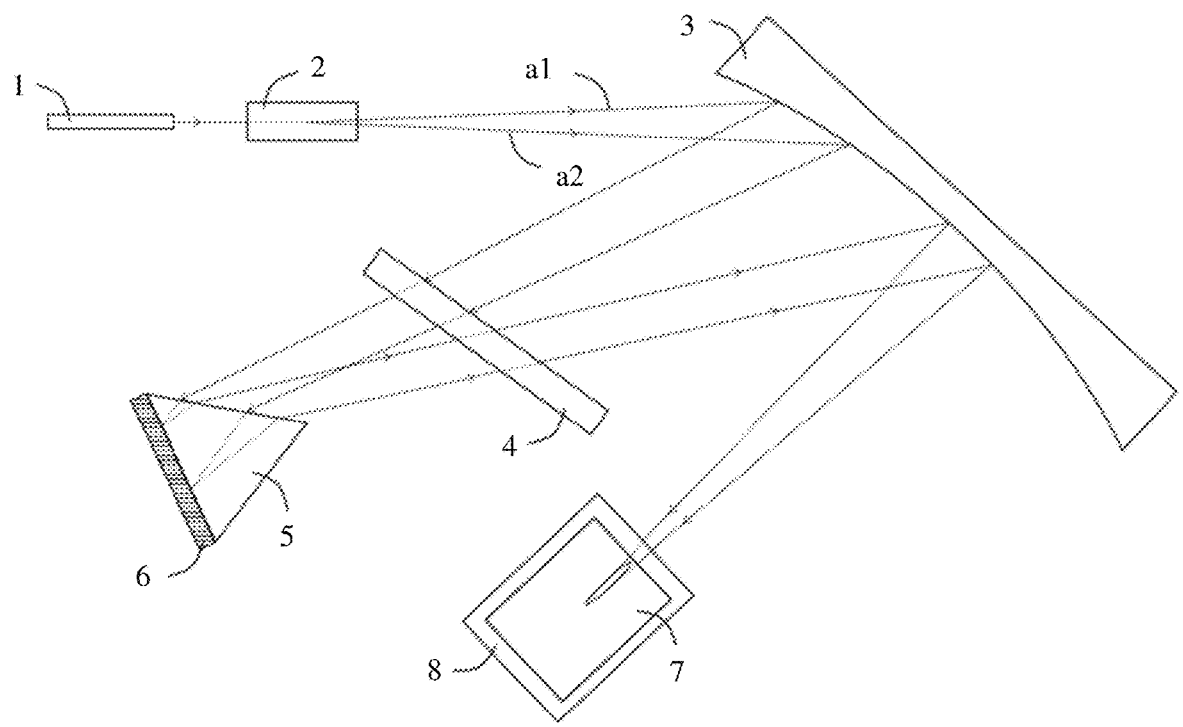
FIG. 2 is a top view of the WSS shown in FIG. 1.

FIG. 1 is a main view of a schematic diagram of an existing WSS based on an LCOS optical switching technology. FIG. 2 is a top view of the WSS shown in FIG. 1. Refer to FIG. 1 and FIG. 2. The WSS includes an optical fiber array 1, a beam shaping and polarization splitting component 2, a curved reflector 3, a cylindrical mirrorlens 4, an optical prism 5, a diffraction grating 6, a reflecting prism 7, and an LCOS 8.

The optical fiber array 1 is used as an input/output port of an optical signal. The optical fiber array includes at least two optical fibers, and each optical fiber is used as a transmission port. Therefore, an optical fiber in the optical fiber array 1 may also be referred to as an optical fiber port. Each optical fiber may be configured to input an optical signal, or may be configured to output an optical signal.

A signal input from any optical fiber of the optical fiber array 1 may be a dense wavelength division multiplexing signal. After the signal is processed by the other optical components in the WSS, a processed signal is output through another optical fiber of the optical fiber array 1, and the output signal may be a signal of any combination of wavelengths. The optical fiber array 1 may be used reversely. For example, an optical signal input from an optical fiber 16 is processed by the optical components in the WSS and then output from an optical fiber 17. Similarly, an optical signal input from the optical fiber 17 may be processed by the optical components in the WSS and then output from the optical fiber 16.

Figure 3:
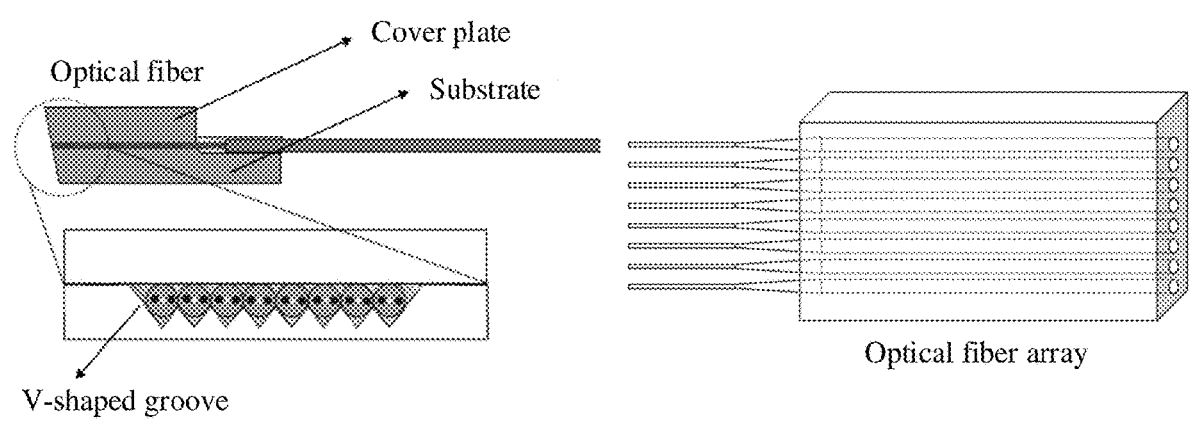
FIG. 3 is a schematic diagram of a main view and a side sectional view of an optical fiber array 1 in the WSS shown in FIG. 1 and FIG. 2.

FIG. 3 is a schematic diagram of a main view and a side sectional view of the optical fiber array 1 in the WSS shown in FIG. 1 and FIG. 2. As shown in FIG. 3, the optical fiber array includes a cover plate, a substrate, and optical fibers. A plurality of V-shaped grooves is disposed on the substrate, the V-shaped grooves are arranged in a straight line, and the optical fibers are disposed in the V-shaped grooves.

Fiber cores of the optical fibers in the optical fiber array 1 are presented as a straight line in a height direction of the WSS. Refer to FIG. 1. A coordinate system XYZ in FIG. 1 is a coordinate system of the WSS. The height direction of the WSS is located on an XOZ plane, a dispersion direction of the WSS is located on a YOZ plane, and the height direction of the WSS is perpendicular to the dispersion direction of the WSS.

The height direction of the WSS is a switching direction of a beam in the WSS, and the height direction of the WSS may also be referred to as a switching direction. The dispersion direction of the WSS is a dispersion direction of the beam in the WSS, and the dispersion direction of the beam is perpendicular to the switching direction of the beam.

It may be understood that dispersion directions of optical signals input from different optical fibers of the optical fiber array 1 are different. Because the dispersion direction of the beam and the switching direction of the beam are perpendicular to each other, switching directions of the optical signals input from the different optical fibers of the optical fiber array 1 are also different. However, the dispersion directions of the optical signals input from the different optical fibers are all located on a same plane. Similarly, the switching directions of the optical signals input from the different optical fibers are all located on a same plane.

A central area in which most optical power of an optical fiber passes through is called a fiber core. The optical fiber includes the fiber core and a protective tube wrapped around the fiber core. As mentioned above, that fiber cores of the optical fibers in the optical fiber array 1 are presented as a straight line in a height direction of the WSS may be understood as that positive centers of the fiber cores of the optical fibers are presented as a straight line in the height direction of the WSS.

The beam shaping and polarization splitting component 2 collimates and shapes an optical input signal transmitted from the optical fiber array 1, splits a shaped beam into beams in orthogonal polarization states, and converts the beams in the orthogonal polarization states into two beams in a same polarization direction: a first beam a1 and a second beam a2. The first beam a1 and the second beam a2 are finally combined at the LCOS 8 and form a loop. Shaping may be converting a circular spot into an elliptical spot. It may be understood that, in another WSS, after a beam shaping and polarization splitting component 2 collimates and shapes an optical input signal, a shaped beam may not be split into two beams.

The curved reflector 3 has a focal power in the dispersion direction; and can collimate and converge the first beam a1 and the second beam a2, and send the first beam a1 and the second beam a2 to the cylindrical lens 4.

The cylindrical lens 4 has a focal power in the height direction; and can collimate and converge the first beam a1 and the second beam a2 in the height direction, and send the first beam a1 and the second beam a2 to the optical prism 5.

The optical prism 5 and the diffraction grating 6 are used in combination. The optical prism 5 can compensate for nonlinearity of dispersion of the diffraction grating 6, and improve a diffraction capability of the diffraction grating 6. The diffraction grating 6 is a reflective diffraction grating, and is configured to disperse the incident beams (the first beam a1 and the second beam a2) into a plurality of single-wavelength optical signals along the dispersion direction, and enable these optical signals to continue to return to and be transmitted to the cylindrical lens 4 and the curved reflector 3 in a same plane along different directions. The curved reflector 3 reflects these optical signals again, and enables light rays of different wavelengths to be focused and distributed on a same focal plane.

The reflecting prism 7 is configured to receive the light rays of different wavelengths on the same focal plane, and reflect the light rays to different pixel locations of the LCOS 8. In the WSS, the reflecting prism 7 is an optional element. A reflecting prism is disposed in some WSSs, and is not disposed in other WSSs. When a reflecting prism is not disposed in a WSS, an optical signal reflected by a curved reflector is directly reflected to different pixel locations of an LCOS.

The LCOS 8 is configured to apply a voltage to a pixel in a location covered by an optical signal, and change a refractive index of a corresponding liquid crystal to change a phase of the optical signal, so that the incident beams are reflected and return along an original incident optical path on planes in which different height directions (switching directions) are located, and is finally coupled into a corresponding optical fiber of the optical fiber array 1 for outputting.

Figure 4:
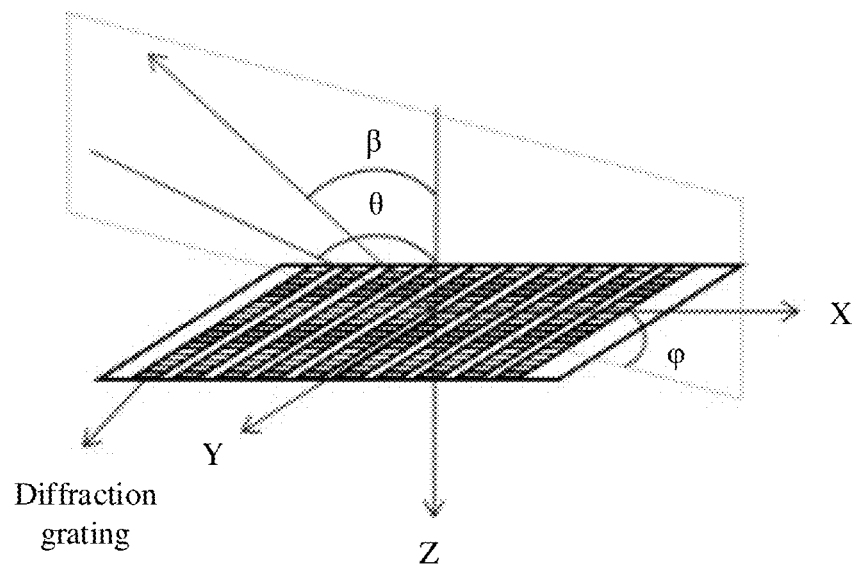
FIG. 4 is a schematic diagram of diffraction generated after a beam arrives at a diffraction grating.

When the beam arrives at the diffraction grating 6, in addition to an incident angle in the dispersion direction, an azimuth also exists in the height direction. FIG. 4 is a schematic diagram of diffraction generated after the beam arrives at the diffraction grating. As shown in FIG. 4, when the beam is incident to the diffraction grating 6, the incident angle is $\theta$, a diffraction angle is $\beta$, and the azimuth is $\varphi$. The azimuth $\varphi$ is an angle between projection of the incident beam on an XOY plane and an X axis.

Figure 5:
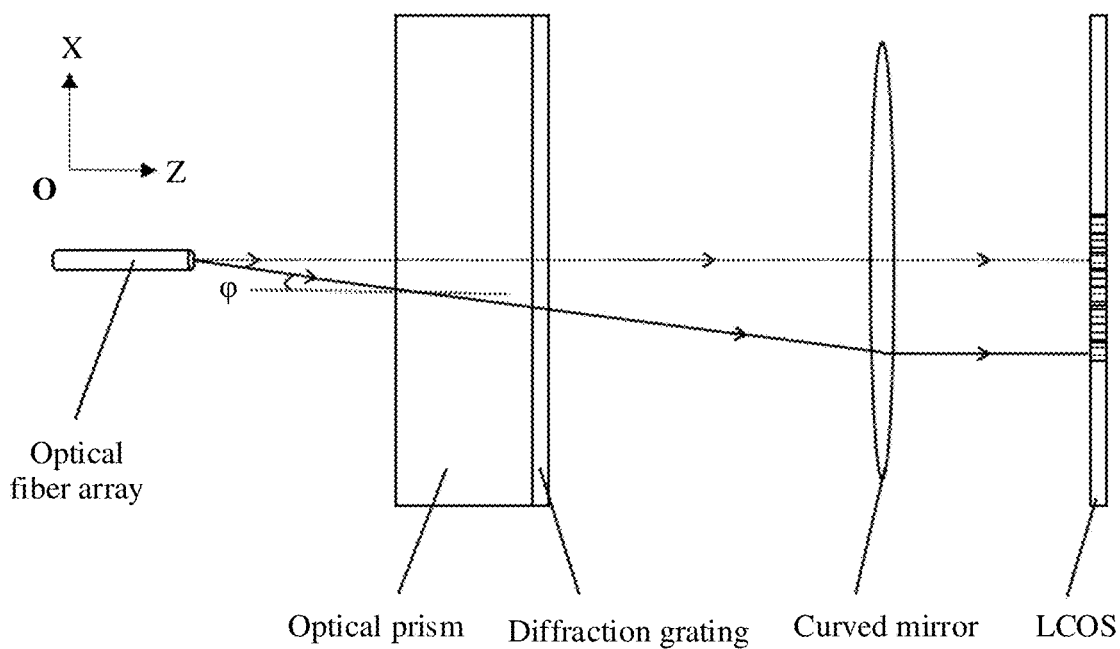
FIG. 5 is a schematic diagram of transmission of a beam in a height direction.
Figure 6:
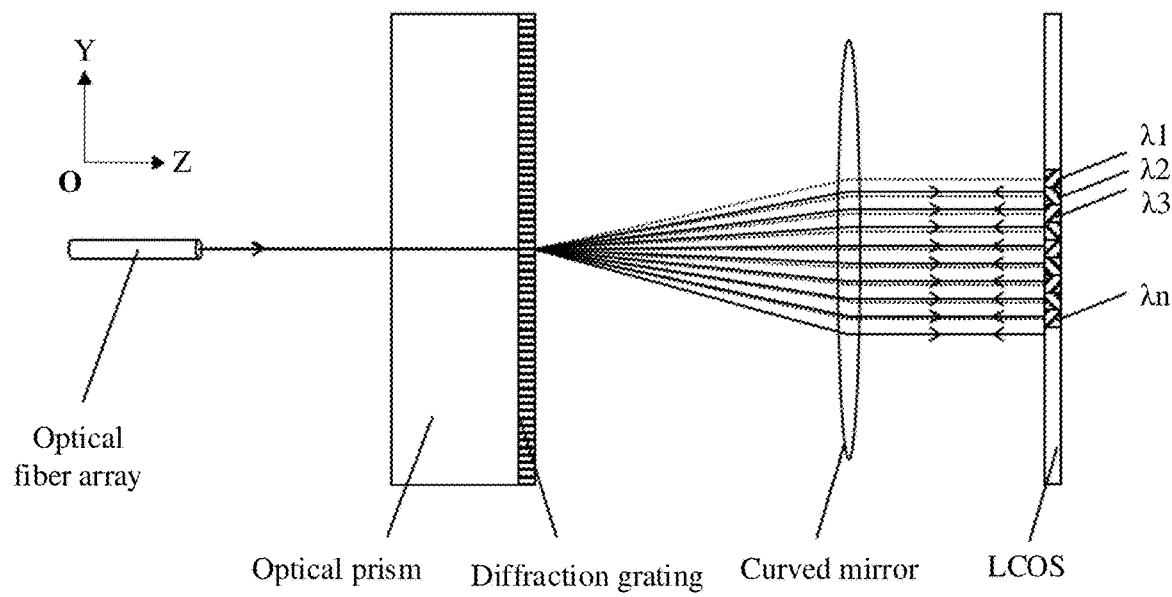
FIG. 6 is a schematic diagram of transmission of a beam in a dispersion direction.

As a quantity of optical fibers in the optical fiber array increases, the azimuth gradually increases, causing an offset of a diffraction spectrum. For a schematic diagram of the offset of the diffraction spectrum of the grating, refer to FIG. 5 and FIG. 6. FIG. 5 is a schematic diagram of transmission of a beam in the height direction, and FIG. 6 is a schematic diagram of transmission of a beam in the dispersion direction. Refer to FIG. 5 and FIG. 6. After optical signals input into the optical fiber array arrive at the optical prism and the diffraction grating, a beam indicated by a dashed line has no azimuth $\varphi$ in the height direction, and a beam indicated by a solid line has an azimuth $\varphi$ in the height direction. The beam indicated by the dashed line is demultiplexed by the diffraction grating and then reflected and converged by the curved reflector, and arrives at a specified location of each wavelength channel on the LCOS, and the offset of the diffraction spectrum occurs. The curved reflector has functions of reflection and focusing, and the curved reflector functions as a focusing lens during focusing.

In the optical fiber array shown in FIG. 3, an azimuth, at which a beam incident from a topmost optical fiber port and a bottommost optical fiber port (the topmost optical fiber port and the bottommost optical fiber port are farthest from an optical axis of the WSS) is incident to the diffraction grating, is the largest. Therefore, a spectral offset is the largest, and a center wavelength offset is the largest when the beam finally arrives at the LCOS. A spectral offset of a beam incident from an intermediate optical fiber port (the intermediate optical fiber port basically overlaps the optical axis of the WSS) after passing through the diffraction grating is the smallest, and a central wavelength offset of the beam is the smallest when the beam finally arrives at the LCOS. Therefore, same wavelengths λ output by different optical fiber ports are separated from each other at a spot location on the LCOS.

The optical axis of the WSS may be an axis of rotational symmetry of an optical element of the WSS. When a light ray is transmitted along the optical axis, deflection does not occur, and the intermediate port coincides with the optical axis. Therefore, an input optical signal to a system through the intermediate port is not prone to deflection, and a relatively large azimuth is not formed, so that a spectrum offset is the smallest.

Figure 7:
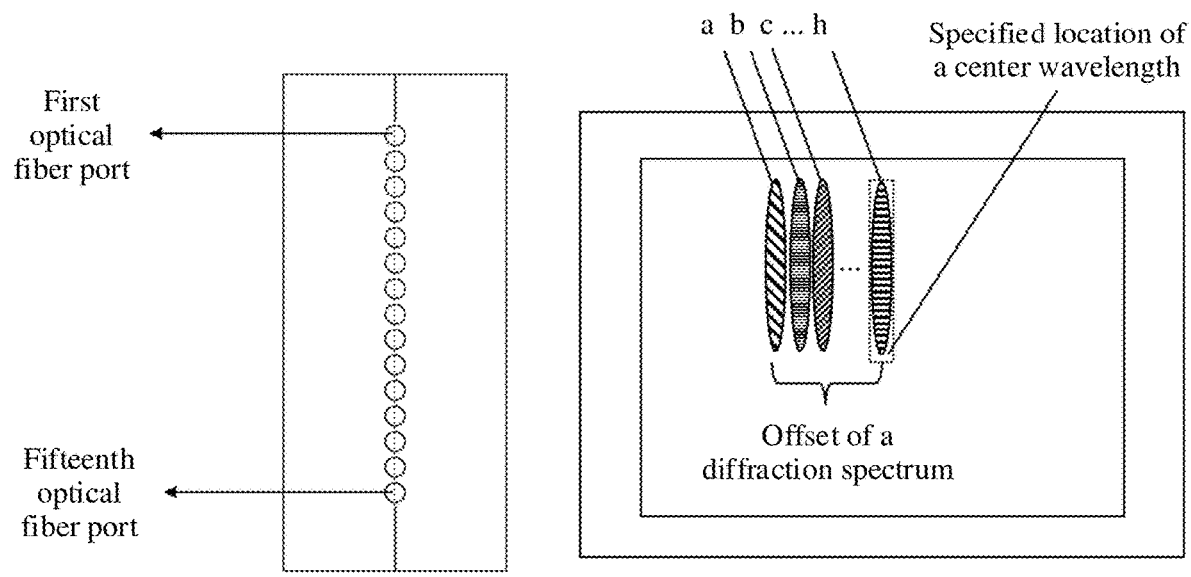
FIG. 7 is a schematic diagram of a spot on an LCOS generated when an optical signal input by an existing optical fiber array arrives.

FIG. 7 is a schematic diagram of a spot on an LCOS when an optical signal input by an existing optical fiber array arrives at the LCOS. An example in which the optical fiber array includes 15 optical fiber ports is used. The optical fiber ports are disposed at an equal pitch and are symmetrically distributed, and numbers of the optical fiber ports increase sequentially from top to bottom. A spot on the LCOS for a single-wavelength signal output by each optical fiber port is shown in FIG. 7. A spot a is a spot of a first optical fiber port (the topmost optical fiber port) and a fifteenth optical fiber port (the bottommost optical fiber port). To be specific, the spot of the first optical fiber port coincides with the spot of the fifteenth optical fiber port, and deviates farthest from a specified location of a center wavelength. A spot b is a spot of a second optical fiber port and a fourteenth optical fiber port, and a spot of the second optical fiber port coincides with a spot of the fourteenth optical fiber port. A spot c is a spot of a third optical fiber port and a thirteenth optical fiber port, and a spot of the third optical fiber port coincides with a spot of the thirteenth optical fiber port. By analogy, a spot h is a spot of an eighth optical fiber port (an intermediate optical fiber port), and deviates closest from the specified location of the center wavelength.

To resolve the problem in the conventional technology, embodiments of this application provide a WSS. A structure of an optical fiber array of the WSS is different from that of the existing optical fiber array. In the embodiments of this application, fiber cores of a plurality of optical fibers included in the optical fiber array are distributed in a curve in a height direction of the WSS, and the plurality of optical fibers include a first optical fiber and at least one second optical fiber. A fiber core of each of the at least one second optical fiber has a first offset relative to a fiber core of the first optical fiber in the height direction. The first offset is used to compensate for a second offset of a diffraction spectrum obtained when a plurality of single-wavelength optical signals obtained after optical input signals are processed by a multiplexing/demultiplexing component arrive at a transmission direction adjustment component, so that the second offset of the diffraction spectrum obtained when the optical input signals input by the plurality of optical fibers arrive at the transmission direction adjustment component is 0 or the second offset is small and may be ignored.

The first optical fiber may be any optical fiber in the optical fiber array, which is not limited in the embodiments. The first optical fiber is only used as a reference for describing a location relationship between optical fibers in the optical fiber array. In a manner, the first optical fiber is an optical fiber whose second offset is the smallest or whose second offset is 0 in the optical fiber array. When a second offset corresponding to the first optical fiber is 0, a first offset corresponding to each of the at least one second optical fiber is equal to the second offset corresponding to the second optical fiber. The second offset corresponding to the first optical fiber is an offset of the diffraction spectrum obtained after an optical signal input through the first optical fiber arrives at the transmission direction adjustment component. The first offset corresponding to the second optical fiber is an offset of the fiber core of the second optical fiber relative to the fiber core of the first optical fiber. The second offset corresponding to the second optical fiber is an offset of the diffraction spectrum obtained after an optical signal input through the second optical fiber arrives at the transmission direction adjustment component. When the first optical fiber is the optical fiber whose second offset is the smallest in the optical fiber array, the second offset is usually very small and may be ignored. In this case, the first offset corresponding to the second optical fiber is approximately equal to the second offset corresponding to the second optical fiber.

In another manner, the first optical fiber is any optical fiber in the optical fiber array except the optical fiber whose second offset is the smallest or whose second offset is 0, and the fiber core of the first optical fiber has a third offset exists relative to a fiber core of the optical fiber whose second offset is the smallest or whose second offset is 0. In this manner, no optical fiber whose second offset is the smallest or whose second offset is 0 is selected for the first optical fiber. Correspondingly, the first offset corresponding to the second optical fiber is a relative value, and the second offset corresponding to the second optical fiber is equal to a sum of the first offset and the third offset.

Figure 8:
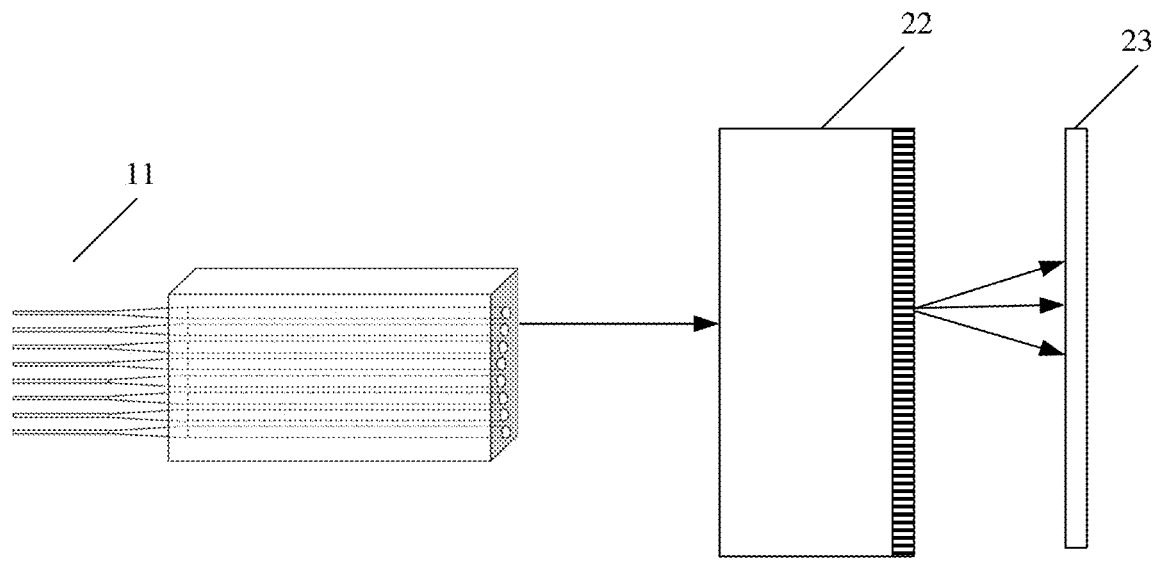
FIG. 8 is a schematic diagram of a WSS according to an Embodiment 1 of this application.

FIG. 8 is a schematic diagram of a WSS according to an Embodiment 1 of this application. As shown in FIG. 8, the WSS includes an optical fiber array 11, a multiplexing/demultiplexing component 22, and a transmission direction adjustment component 23. The optical fiber array 11 is configured to receive an optical input signal transmitted by a light source. The multiplexing/demultiplexing component 22 is configured to split the optical input signal into a plurality of single-wavelength optical signals in space. The transmission direction adjustment component 23 is configured to separately change transmission directions of the plurality of single-wavelength optical signals. The optical fiber array 11 is further configured to output an optical output signal. The optical output signal is an optical output signal obtained after being processed by a series of optical components included in the WSS.

The optical fiber array 11 includes one first optical fiber and at least one second optical fiber. Some optical fibers are used as input ports, and the other optical fibers are used as output ports. The optical input signal is input from an input port, and the optical output signal is output from an output port. Fiber cores of a plurality of optical fibers in the optical fiber array 11 are distributed in a curve in a height direction of the wavelength selective switch. A fiber core of each of the at least one second optical fiber has a first offset relative to a fiber core of the first optical fiber in the height direction, and the first offset is used to compensate for a second offset of a diffraction spectrum generated when the plurality of single-wavelength optical signals obtained after the optical input signal is processed by the multiplexing/demultiplexing component 22 arrive at the transmission direction adjustment component 23.

Figure 9:
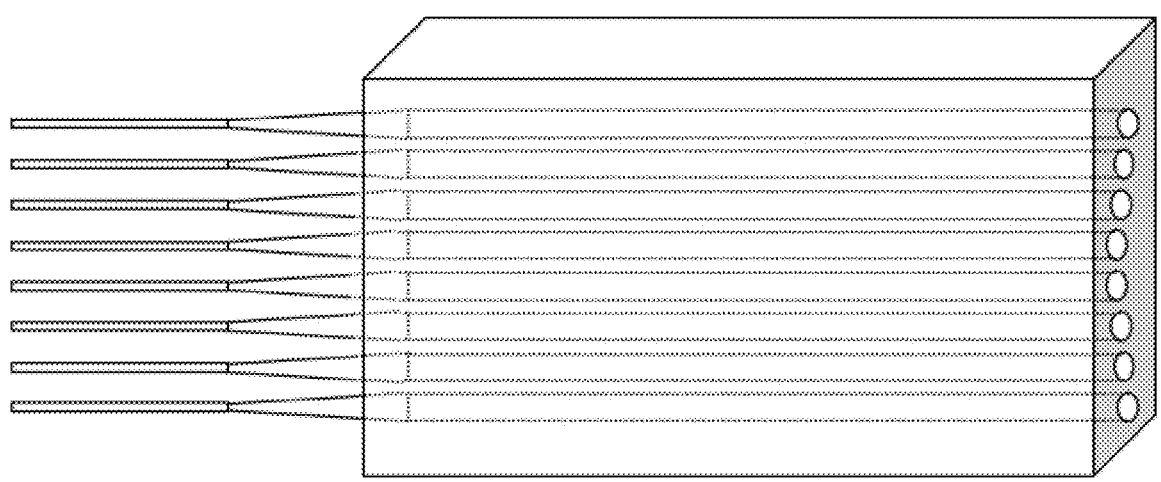
FIG. 9 is a schematic diagram of an optical fiber array in the WSS shown in FIG. 8.

FIG. 9 is a schematic diagram of the optical fiber array in the WSS shown in FIG. 8. By comparing FIG. 3 with FIG. 9, the fiber cores of the optical fibers in the optical fiber array in FIG. 3 are distributed in the straight line, and fiber cores of optical fibers in the optical fiber array in FIG. 9 are distributed in a curve.

Figure 10:
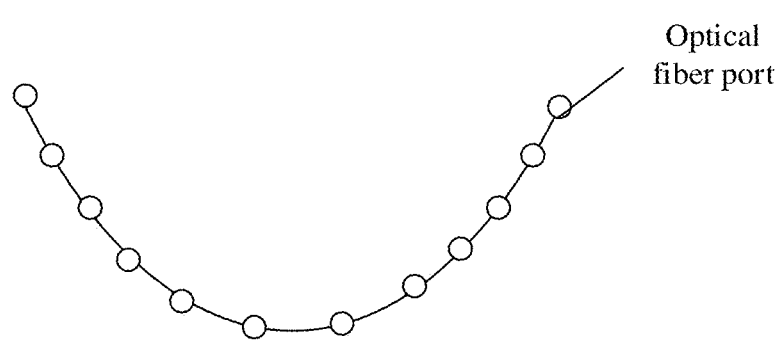
FIG. 10 is a schematic diagram of arrangement of an optical fiber array in the WSS shown in FIG. 8.

FIG. 10 is a schematic diagram of arrangement of the optical fiber array in the WSS shown in FIG. 8. Referring to FIG. 10, fiber cores of optical fibers in the optical fiber array are distributed in an arc shape. It may be understood that the fiber cores of the optical fibers may alternatively be distributed in a curve of another shape, for example, an irregular curve. This is not limited in this embodiment. A shape of a curve formed by the fiber cores of the optical fibers in the optical fiber array is related to a distance between the optical fibers.

In an optical fiber array, a first distance between a fiber core of an optical fiber at a topmost or bottommost location in the optical fiber array and a fiber core of a neighboring optical fiber is not equal to a second distance between fiber cores of neighboring optical fibers in remaining optical fibers, and second pitches between the fiber cores of the neighboring optical fibers in the remaining optical fibers are equal. In this manner, except for a first pitch between two optical fibers at topmost locations, distances between fiber cores of other optical fibers are equal. Optionally, in a possible implementation, distances between fiber cores of any two optical fibers are unequal.

Figure 11:
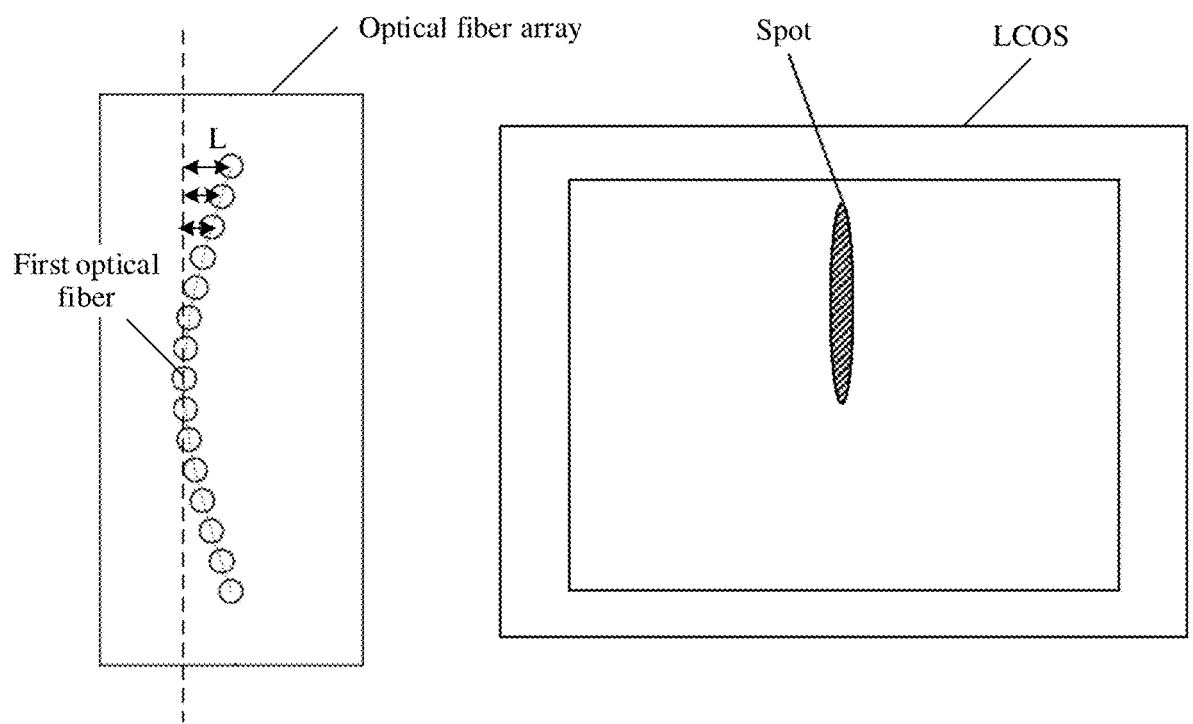
FIG. 11 is a schematic diagram of a spot on an LCOS generated when an optical signal input by an optical fiber array in an embodiment of this application arrives.

FIG. 11 is a schematic diagram of a spot on an LCOS generated when an optical signal input by an optical fiber array arrives at the LCOS according to this application. As shown in FIG. 11, the optical fiber array includes 15 optical fiber ports. It is assumed that the eighth optical fiber port is a first optical fiber, a second offset L corresponding to the eighth optical fiber port is 0, a topmost optical fiber port and a bottommost optical fiber port are symmetric relative to the first optical fiber, and first offsets of other optical fiber ports relative to a fiber core of the first optical fiber are all greater than 0. It may be understood that, in another possible implementation, any optical fiber may be set as the first optical fiber.

In FIG. 11, the optical fibers in the optical fiber array are symmetrically distributed in an up-down direction by using the first optical fiber as a center, and all optical fiber ports except the first optical fiber port and the second optical fiber port are evenly spaced. Therefore, first offsets of the second optical fiber port and the fourteenth optical fiber port relative to the first optical fiber are equal, and first offsets of the third optical fiber port and the thirteenth optical fiber port relative to the first optical fiber are the same. A first offset corresponding to the first optical fiber port (the topmost optical fiber port) and a first offset corresponding to the fifteenth optical fiber port (the bottommost optical fiber port) are greater than the first offsets corresponding to the other optical fiber ports.

The optical fiber array shown in FIG. 11 compensates, by using a first offset, in a height direction, of a fiber core of each optical fiber relative to a port of a first optical fiber of a WSS, a second offset of a diffraction spectrum generated when a plurality of single-wavelength optical signals obtained after an optical input signal is processed by a multiplexing/demultiplexing component 22 arrive at a transmission direction adjustment component 23, so that the diffraction spectrum of the optical signals input by the optical fibers does not offset when the optical signals arrive at the transmission direction adjustment component 23, in other words, spots formed after the optical fiber signals input by the optical fibers arrive at the transmission direction adjustment component 23 overlap, for example, spots shown in FIG. 11.

When the first optical fiber is an optical fiber whose second offset is the smallest or whose second offset is 0 in the optical fiber array, a first offset of a fiber core of each of a plurality of optical fibers relative to the port of the first optical fiber in the height direction is equal to a second offset of a diffraction spectrum generated when an optical signal input by the optical fiber arrives at the transmission direction adjustment component 23. When the multiplexing/demultiplexing component 22 is a diffraction grating, a second offset (equal to a first shift corresponding to another optical fiber) corresponding to the another optical fiber may be calculated in the following manner:

When a beam is incident to the diffraction grating, a generated incident angle, a generated diffraction angle, and a generated azimuth are shown in FIG. 4. When the azimuth is 0, a grating equation satisfies the following formula (1):

$$n \cdot (\sin \theta + \sin \beta) = j\lambda/d,$$

where n is a refractive index of a grating material, j is a diffraction secondary level of the grating, d is a diffraction period, $\lambda$ is a wavelength of the incident beam, $\theta$ is the incident angle, and $\beta$ is the diffraction angle.

When the azimuth is not 0, a grating equation satisfies the following formula (2):

$$n \cdot (\sin \theta \cos \varphi + \sin \beta_2 \cdot \cos \varphi) = j\lambda/d,$$

where n is a refractive index of a grating material, j is a diffraction secondary level of the grating, d is a diffraction period, $\lambda$ is a wavelength of the incident beam, $\theta$ is the incident angle, and $\beta_2$ is the diffraction angle.

The foregoing formula (1) and formula (2) are deformed to obtain $\sin \beta = j\lambda/nd - \sin \theta$ and $\sin \beta_2 = j\lambda/\cos \varphi \cdot nd - \sin \theta$. It can be learned by comparing the deformed formulas that, when the azimuth exists, it is ensured that the incident angle remains unchanged, and the diffraction angle changes to some extent. In addition, a larger azimuth indicates a larger change in the diffraction angle, and a larger second offset of a diffraction spectrum generated when the beam is incident on the transmission direction adjustment component 23 is.

According to the foregoing relationship between the diffraction angle and the second offset of the diffraction spectrum, the second offset of the diffraction spectrum may be expressed as: $L=f^*\tan(\Delta\beta)$, where f represents a focal length, and $\Delta\beta$ represents a variation of the diffraction angle.

It is assumed that the incident angle is 60°, the grating refractive index is 1.6, the azimuth is 2°, the incident wavelength is 1.55 μm, the diffraction period is 0.575 μm, and the diffraction order is 1. In this case, $\beta$ is 54.9605775°, $\beta2$ is 55.0631771°, and the variation $\Delta\beta$ of the diffraction angle is 55.0631771°−54.9605775°=0.1025996°. If the focal length is 75 mm, the second offset of the diffraction spectrum is 75 mm*tan(0.1025996°)=0.1343 mm.

Generally, a larger quantity of optical fibers included in the optical fiber array indicates a larger second offset of the diffraction spectrum. Correspondingly, a first offset of a fiber core of an optical fiber relative to the port of the first optical fiber in the height direction varies with a quantity of optical fibers included in the optical fiber array. The first offset may range from 4 micrometers to 200 micrometers, including 4 micrometers and 200 micrometers.

When the optical fiber array includes a relatively small quantity of optical fibers, the second offset of the diffraction spectrum is relatively small, and impact on a system is very small and may be ignored. For example, when the quantity of optical fibers included in the optical fiber array is less than or equal to 4, a spectrum offset is relatively small and may be ignored. It may be understood that the WSS in this application has no requirement on the quantity of optical fibers, and regardless of the quantity of optical fibers, a fiber core of an optical fiber may be offset relative to the port of the first optical fiber.

In this embodiment, the multiplexing/demultiplexing component 22 may be a grating component, or may be another device having a demultiplexing and multiplexing function. The optical input signal may be a multi-wavelength optical signal with a plurality of wavelengths, for example, a multi-wavelength optical signal with two or more wavelengths. After passing through the multiplexing/demultiplexing component 22, the multi-wavelength optical signal may form a single-wavelength optical signal with a plurality of single wavelengths separated in space. The single-wavelength optical signal may be an optical signal with a single center wavelength. The grating component may be a transmissive grating component or a reflective grating component.

After these single-wavelength optical signals are modulated by the transmission direction adjustment component 23, for example, after a phase, a reflection angle, or a refraction angle of each single-wavelength optical signal is changed, a transmission direction of the single-wavelength optical signal is changed, so that each single-wavelength optical signal can be output to an expected location. One single-wavelength optical signal may be input to at least two different expected fixed locations.

In this embodiment, the transmission direction adjustment component 23 may be a switching apparatus using a plurality of pixels, and each pixel may be separately controlled. Specifically, for example, a value of a voltage loaded to each pixel is changed, so that pixels form a phase grating, and the pixels may have different grayscale values. Therefore, the formed phase grating may produce different diffraction effects, or an optical signal passing through the phase grating has different deflection directions.

Optionally, the transmission direction adjustment component 23 may be an MEMS, an LCOS, or an LC.

It should be understood that the transmission direction adjustment component 23 may include a plurality of transmission direction adjustment sub-components, configured to separately control different single-wavelength optical signals.

It may be understood that, in this embodiment, the WSS not only includes the optical fiber array, the multiplexing/demultiplexing component, and the transmission direction adjustment component, but also includes one or more other optical elements. The optical elements in the WSS are sequentially arranged based on a sequence of processing an optical signal. Different WSSs include different optical elements.

Optionally, the WSS further includes a beam shaping and polarization splitting component, a curved reflector, and a cylindrical lens. The beam shaping and polarization splitting component is configured to collimate and shape the optical input signal, split a shaped beam into beams in orthogonal polarization states, and convert the beams in the orthogonal polarization states into two beams in a same polarization direction: a first beam and a second beam. The curved reflector is configured to collimate and converge the first beam and the second beam in a dispersion direction, and send the first beam and the second beam to the cylindrical lens. The cylindrical lens is configured to collimate and converge the first beam and the second beam in the height direction, and send the first beam and the second beam to the multiplexing/demultiplexing component.

The WSS provided in this embodiment includes the optical fiber array, the multiplexing/demultiplexing component, and the transmission direction adjustment component. A first offset is set for the fiber core of the second optical fiber included in the optical fiber array relative to the fiber core of the first optical fiber in the height direction. The first offset is used to compensate for the second offset of the diffraction spectrum generated when the plurality of single-wavelength optical signals obtained after the optical input signal is processed by the multiplexing/demultiplexing component arrive at the transmission direction adjustment component, so that the second offset of the diffraction spectrum of the plurality of single-wavelength optical signals arriving at the transmission direction adjustment component is 0 or may be ignored. In this manner, the fiber core of the second optical fiber in the optical fiber array offsets relative to the port of the first optical fiber in the height direction, so that the offset of the diffraction spectrum can be compensated for. An optical system has a simple structure, and no optical element needs to be added. This increases optical design freedom, facilitates optical path system commissioning, and reduces reliability risks and costs of subsequent products.

Figure 12:
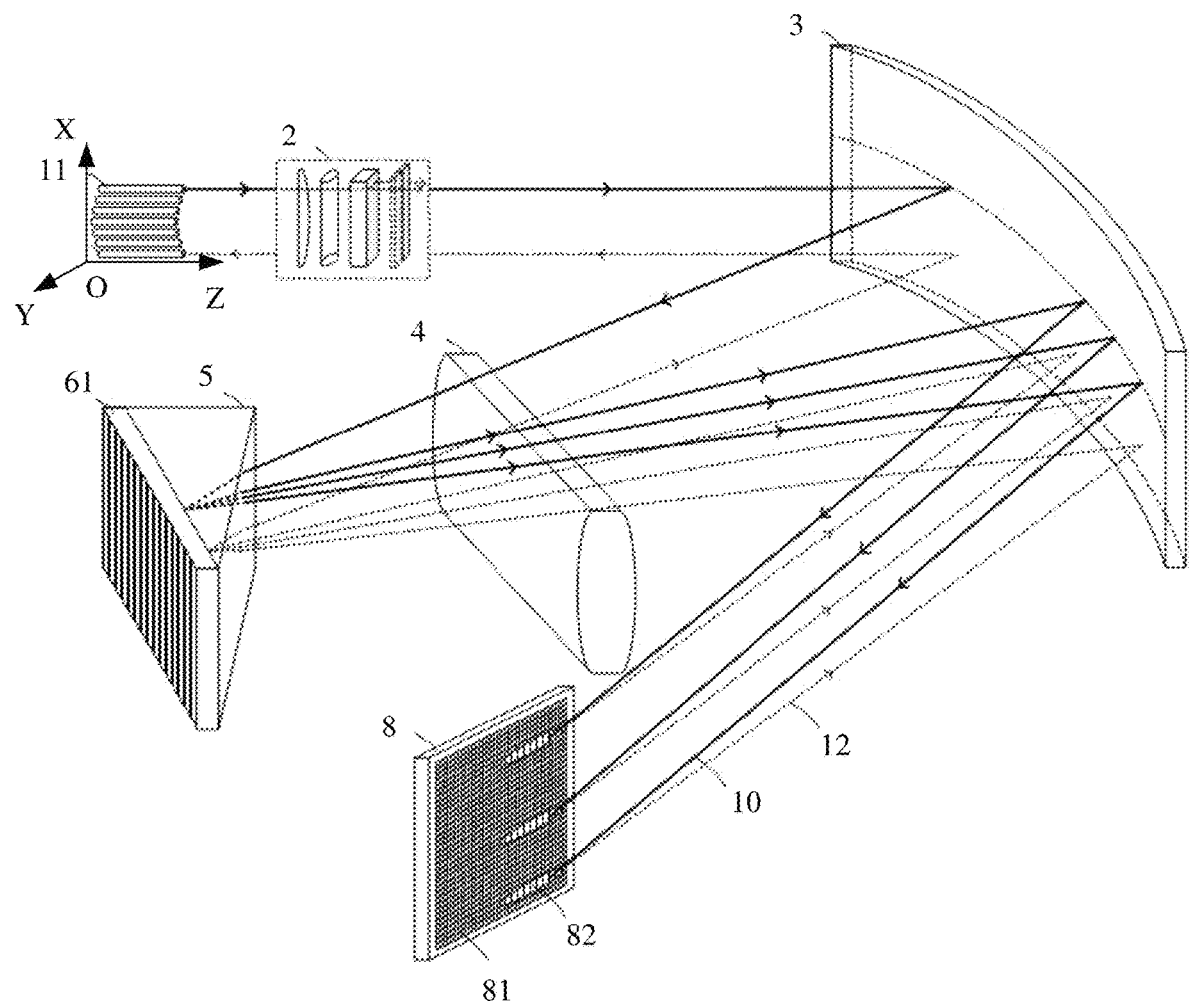
FIG. 12 is a schematic diagram of a WSS according to an Embodiment 2 of this application.

FIG. 12 is a schematic diagram of a WSS according to an Embodiment 2 of this application. As shown in FIG. 12, the WSS includes an optical fiber array 11, a beam shaping and polarization splitting component 2, a curved reflector 3, a cylindrical lens 4, an optical prism 5, a reflective diffraction grating 61, and an LCOS 8. In the figure, a solid line indicates a schematic diagram of propagation of an optical input signal 10, and a dashed line indicates a schematic diagram of propagation of an optical output signal 12.

A structure described in the Embodiment 1 is used for the optical fiber array 11, to be specific, fiber cores of a plurality of optical fibers included in the optical fiber array 11 are distributed in a curve in a height direction of the WSS.

The beam shaping and polarization splitting component 2 collimates and shapes the optical input signal transmitted from the optical fiber array 11, splits a shaped beam into beams in orthogonal polarization states, and converts the beams in the orthogonal polarization states into two beams in a same polarization direction: a first beam and a second beam.

The curved reflector 3 has a focal power in a dispersion direction; and is configured to collimate and converge the first beam and the second beam in the dispersion direction, and send the first beam and the second beam to the cylindrical lens 4.

The cylindrical lens 4 is configured to collimate and converge the first beam and the second beam in the height direction, and send the first beam and the second beam to the optical prism 5.

The optical prism 5 and the reflective diffraction grating 61 are combined to form a reflective grating component. The optical prism 5 can compensate for nonlinearity of grating dispersion, and improve a diffraction capability of the reflective diffraction grating 61. The reflective diffraction grating 61 is configured to diverge the received beam into a plurality of single-wavelength optical signals along the dispersion direction. These optical signals continue to return to and be transmitted to the optical prism 5 and the cylindrical lens 4 in a same plane along different directions. After arriving at the curved reflector 3 through the cylindrical lens 4, the curved reflector 3 reflects the plurality of single-wavelength optical signals again, and the reflected optical signals arrive at the LCOS 8.

The LCOS 8 is configured to change transmission directions of the plurality of single-wavelength optical signals, and the plurality of single-wavelength optical signals, of which directions are changed, return along original optical paths in different heights to form the optical output signal. Refer to FIG. 12. Propagation paths of the optical input signal 10 and the optical output signal 12 are the same, but propagation directions are opposite.

The LCOS 8 includes a plurality of pixels 81. A beam reflected by the curved reflector 3 to the LCOS 8 hits a pixel of the LCOS 8 to form an elliptical spot 82. The LCOS 8 applies a voltage to the pixel covered by the beam, and changes a refractive index of a corresponding liquid crystal to change a phase of the beam, so that the beams incident to the LCOS 8 are reflected and return along the original optical paths but on planes in which different height directions are located, and are finally coupled to a corresponding output port of the optical fiber array 11.

Optionally, the WSS in this embodiment may further include a reflecting prism, and the reflecting prism is configured to deflect, to the LCOS 8, the beam reflected by the curved reflector 3.

Figure 13:
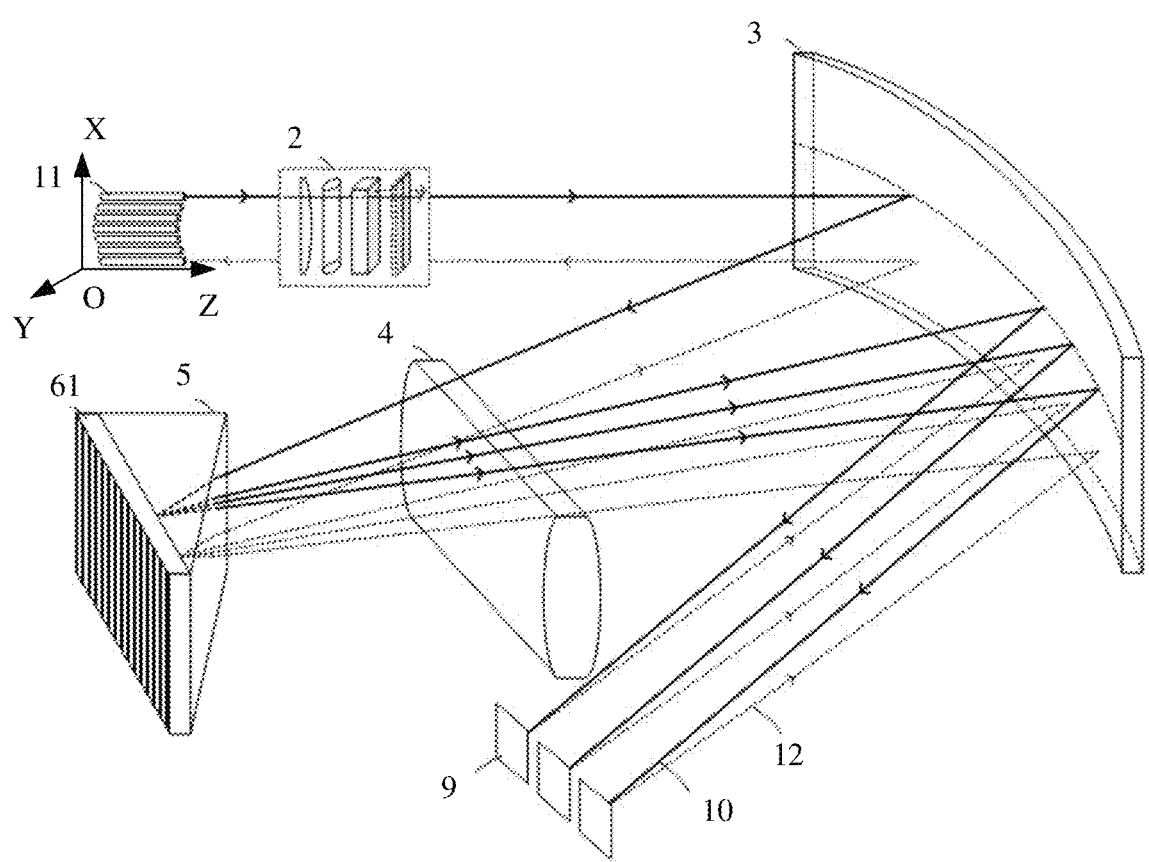
FIG. 13 is a schematic diagram of a WSS according to an Embodiment 3 of this application.

FIG. 13 is a schematic diagram of a WSS according to an Embodiment 3 of this application. As shown in FIG. 13, the WSS includes an optical fiber array 11, a beam shaping and polarization splitting component 2, a curved reflector 3, a cylindrical lens 4, an optical prism 5, a reflective diffraction grating 61, and an MEMS reflector 9. In the figure, a solid line indicates a schematic diagram of propagation of an optical input signal 10, and a dashed line indicates a schematic diagram of propagation of an optical output signal 12. Propagation paths of the optical input signal 10 and the optical output signal 12 are the same, but propagation directions are opposite.

A structure described in Embodiment 1 is used for the optical fiber array 11, to be specific, fiber cores of a plurality of optical fibers included in the optical fiber array 11 are distributed in a curve in a height direction of the WSS.

A difference between the WSS in this embodiment and the WSS shown in FIG. 12 lies in: An optical switching technology of the WSS in this embodiment uses the MEMS reflector, and the other optical components are the same as those of the WSS shown in FIG. 12. In this embodiment, a plurality of MEMS reflectors 9 may be disposed in the WSS, and each MEMS reflector 9 corresponds to an optical signal of one wavelength. Rotation of the MEMS reflector 9 is driven and controlled by using a chip, so that incident beams may be reflected and return along original optical paths but on planes in which different height directions are located.

Figure 14:
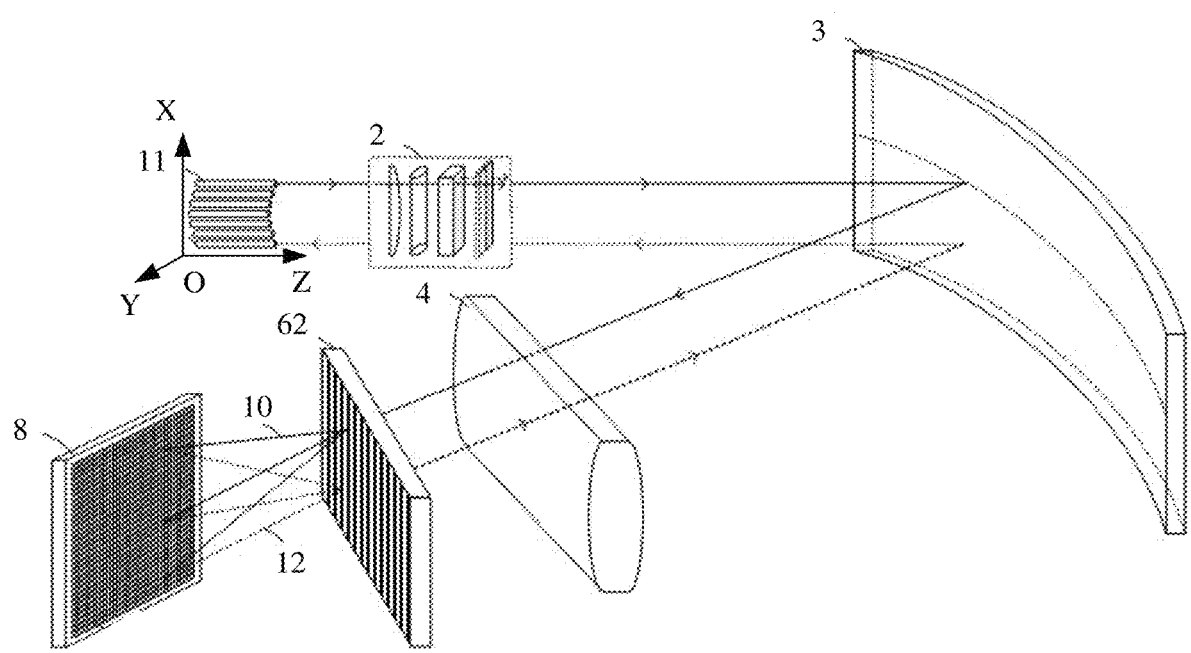
FIG. 14 is a schematic diagram of a WSS according to an Embodiment 4 of this application.

FIG. 14 is a schematic diagram of a WSS according to an Embodiment 4 of this application. As shown in FIG. 14, the WSS includes an optical fiber array 11, a beam shaping and polarization splitting component 2, a curved reflector 3, a cylindrical lens 4, a transmissive diffraction grating 62, and an LCOS 8. In the figure, a solid line indicates a schematic diagram of propagation of an optical input signal 10, and a dashed line indicates a schematic diagram of propagation of an optical output signal 12. Propagation paths of the optical input signal 10 and the optical output signal 12 are the same, but propagation directions are opposite.

A structure described in Embodiment 1 is used for the optical fiber array 11, to be specific, fiber cores of a plurality of optical fibers included in the optical fiber array 11 are distributed in a curve in a height direction of the WSS.

A difference between the WSS in this embodiment and the WSS shown in FIG. 12 lies in: A grating of the WSS in this embodiment is the transmissive diffraction grating 62, and the other optical components are the same as those of the WSS shown in FIG. 12. An optical prism that forms a grating component with the transmissive diffraction grating 62 is not shown in FIG. 14, and the optical prism is configured to perform nonlinear compensation and diffraction capability improvement on the transmissive diffraction grating 62.

Correspondingly, the propagation paths of the optical input signal 10 and the optical output signal 12 are different from those shown in FIG. 12. A beam arrives at the transmissive diffraction grating 62, and a plurality of single-wavelength optical signals obtained after being split by the transmissive diffraction grating 62 arrive at the LCOS 8, without a need to reflect the single-wavelength optical signals to the LCOS 8 through the cylindrical mirrorlens 4 and the curved reflector 3, as shown in FIG. 12.

Figure 15:
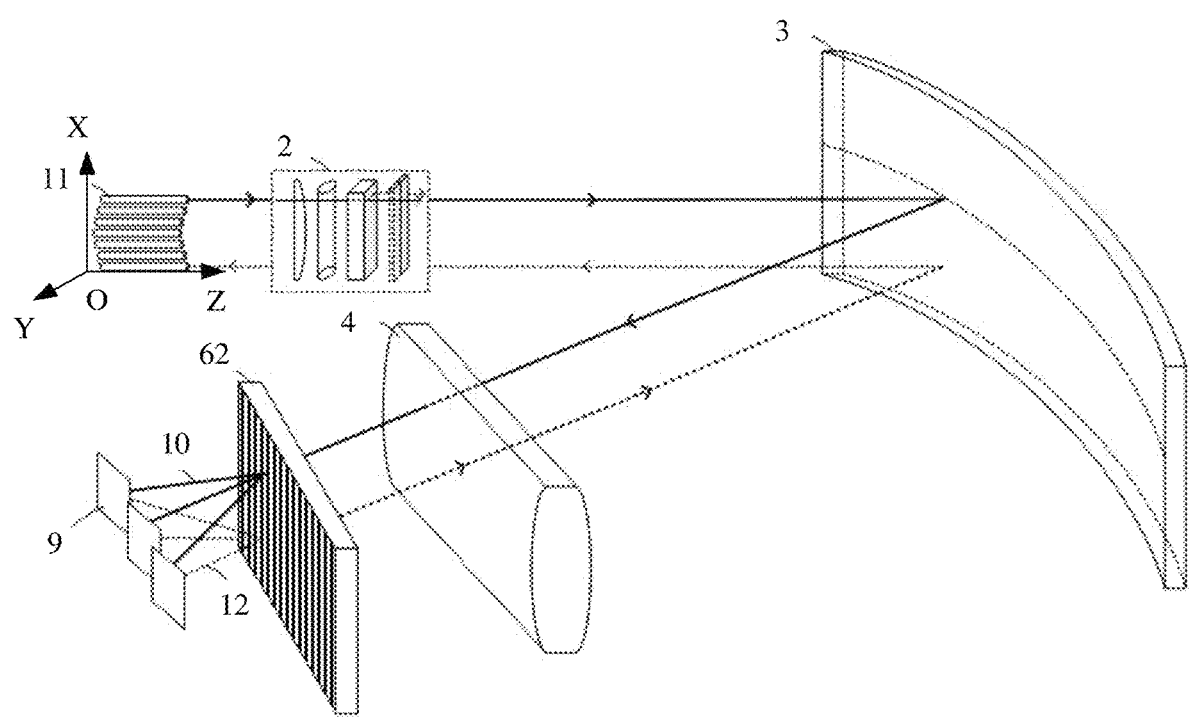
FIG. 15 is a schematic diagram of a WSS according to an Embodiment 5 of this application.

FIG. 15 is a schematic diagram of a WSS according to an Embodiment 5 of this application. As shown in FIG. 15, the WSS includes an optical fiber array 11, a beam shaping and polarization splitting component 2, a curved reflector 3, a cylindrical lens 4, a transmissive diffraction grating 62, and an MEMS reflector 9. In the figure, a solid line indicates a schematic diagram of propagation of an optical input signal 10, and a dashed line indicates a schematic diagram of propagation of an optical output signal 12. Propagation paths of the optical input signal 10 and the optical output signal 12 are the same, but propagation directions are opposite.

A structure described in Embodiment 1 is used for the optical fiber array 11, to be specific, fiber cores of a plurality of optical fibers included in the optical fiber array 11 are distributed in a curve in a height direction of the WSS.

A difference between the WSS in this embodiment and the WSS shown in FIG. 14 lies in: An optical switching technology of the WSS in this embodiment uses the MEMS reflector, the other optical components are the same as those of the WSS shown in FIG. 14, and a propagation path of the optical signal is also the same as that of the WSS shown in FIG. 14. In this embodiment, a plurality of MEMS reflectors 9 may be disposed in the WSS, and each MEMS reflector 9 corresponds to an optical signal of one wavelength. Rotation of the MEMS reflector 9 is driven and controlled by using a chip, so that incident beams may be reflected and return along original optical paths but on planes in which different height directions are located.

Figure 16:
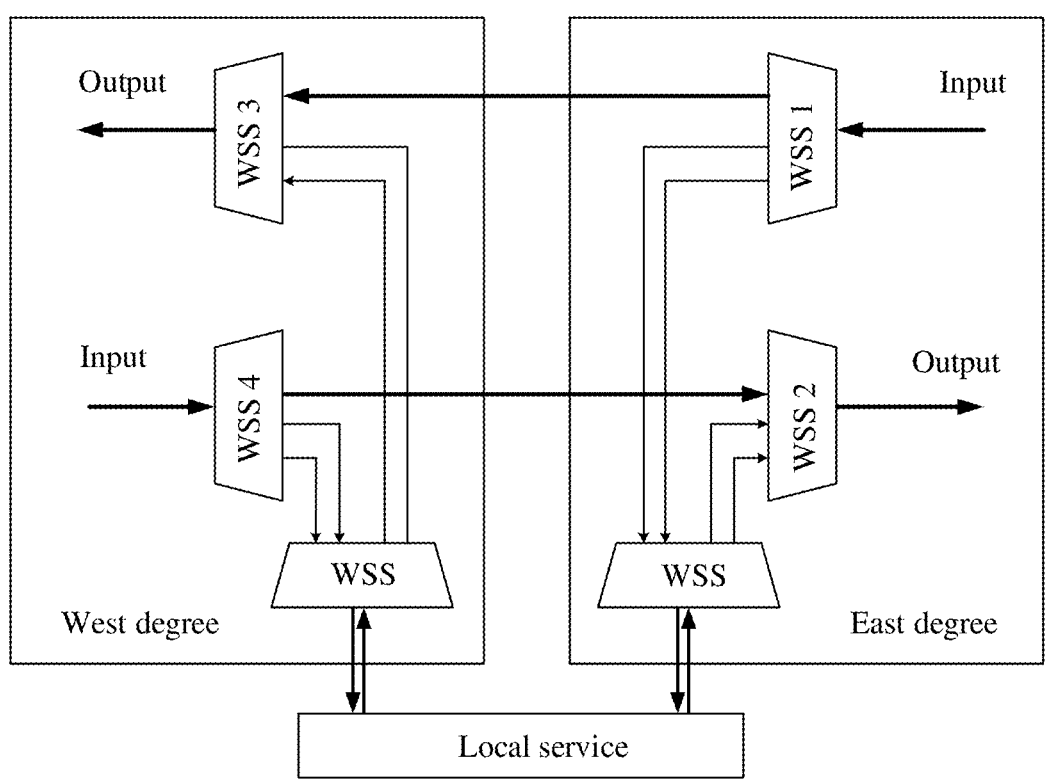
FIG. 16 is a schematic diagram of a structure of a ROADM device according to an embodiment of this application.

FIG. 16 is a schematic diagram of a structure of a ROADM device according to an embodiment of this application. The ROADM device shown in FIG. 16 includes four WSSs connected to each other through input and output ports, and each WSS is connected to a different ROADM switching direction, which is referred to as a degree or a direction. FIG. 16 is a ring-shaped two-degree ROADM device: an east degree and a west degree. The WSS may route any wavelength to a branch side of a node, or bypass the wavelength to a next node.

This architecture increases flexibility by allowing a wavelength to route from any line to any line or to drop from any line to any line. In the event of any service failure, a protection wavelength routes its path through a network to overcome or bypass the failure.

Figure 17:
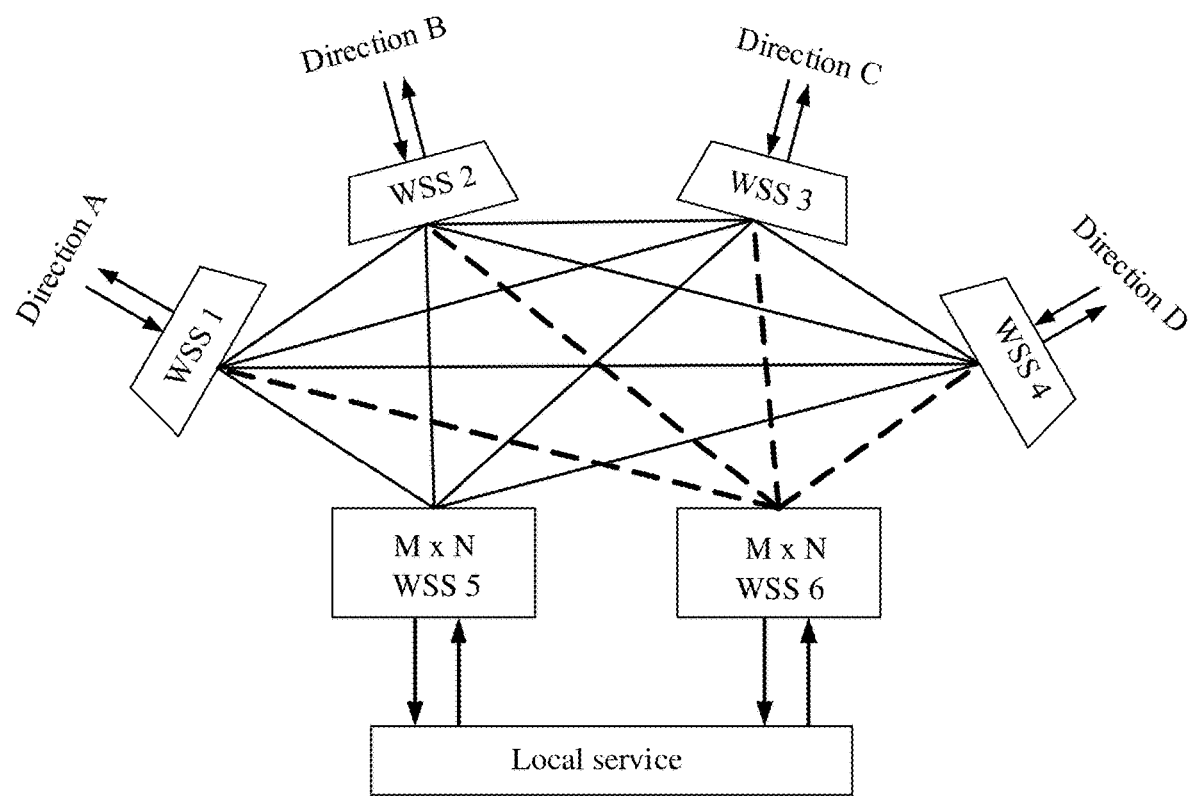
FIG. 17 is a schematic diagram of another structure of a ROADM device according to an embodiment of this application.

The second-degree ROADM device may be used in a simple ring topology. For a more complex mesh network system structure, a higher-level ROADM device is required. As shown in FIG. 17, FIG. 17 is a schematic diagram of another structure of a ROADM device according to an embodiment of this application. The ROADM device shown in FIG. 17 includes six WSSs. A WSS 1, a WSS 2, a WSS 3, and a WSS 4 are single-port devices, and a WSS 5 and a WSS 6 are multi-port devices. The ROADM device has four directions in total: a direction A, a direction B, a direction C, and a direction D.

Any WSS provided in the foregoing embodiments of this application may be used as the WSS in the ROADM device shown in FIG. 16 and FIG. 17.

The foregoing descriptions are merely non-limiting examples of specific implementations and are not intended to limit the protection scope, which is intended to cover any variation or replacement determined by a person skilled in the art. Therefore, the claims shall define the protection scope.

What is claimed is:

1. A wavelength selective switch, comprising:
   a plurality of optical fibers, configured to receive an optical input signal transmitted by a light source, wherein the plurality of optical fibers comprise a reference optical fiber and at least one other optical fiber, and a fiber core of each of the at least one other optical fiber has a first distance relative to a fiber core of the reference optical fiber in a height direction of the wavelength selective switch, the height direction is a direction perpendicular to a longitudinal axis of the plurality of optical fibers, and the height direction is a switching direction of a beam in the wavelength selective switch and is perpendicular to a dispersion direction of the beam;
   a multiplexing/demultiplexing component, configured to split the optical input signal into a plurality of single-wavelength optical signals in space along the dispersion direction perpendicular to the height direction; and
   a liquid crystal on silicon (LCOS) including an array of pixels, wherein the LCOS is configured to:
   receive the plurality of single-wavelength optical signals; and
   apply a voltage to a pixel in a location covered by each of the plurality of single-wavelength optical signals, and change a refractive index of a corresponding liquid crystal to change a phase of the single-wavelength optical signal so that an offset of a diffraction spectrum for the single-wavelength optical signal transmitted via the respective other optical fiber is compensated by the first distance of the respective other optical fiber, wherein the offset of the diffraction spectrum is an offset relative to a specified location of a center wavelength on the LCOS, and indicates how far the diffraction spectrum deviates from the specified location of the center wavelength on the LCOS,
   wherein the plurality of optical fibers is further configured to output an optical output signal obtained after the optical input signal is processed by the wavelength selective switch.

2. The switch according to claim 1, wherein the offset of the diffraction spectrum for the reference optical fiber is 0 or the smallest among the offsets of the diffraction spectrums for the plurality of optical fibers.

3. The switch according to claim 1, wherein the reference optical fiber is an optical fiber in the plurality of optical fibers other than an optical fiber having an offset that is 0 or the smallest among the offsets of the plurality of optical fibers, the fiber core of the reference optical fiber has a third distance relative to a fiber core of the optical fiber having the offset that is 0 or the smallest among the offsets of the plurality of optical fibers, and the offset of the diffraction spectrum for each of the at least one other optical fiber is equal to a sum of the first distance of the optical fiber and the third distance.

4. The switch according to claim 1, further comprising a beam shaping and polarization splitting component, a curved reflector, and a cylindrical lens, wherein the beam shaping and polarization splitting component is configured to collimate and shape the optical input signal, split a shaped beam into beams in orthogonal polarization states, and convert the beams in the orthogonal polarization states into two beams in a same polarization direction: a first beam and a second beam;
   the curved reflector is configured to collimate and converge the first beam and the second beam in a dispersion direction, and send the first beam and the second beam to the cylindrical lens;
   and the cylindrical lens is configured to collimate and converge the first beam and the second beam in the height direction, and send the first beam and the second beam to the multiplexing/demultiplexing component.

5. The switch according the claim 4, wherein the multiplexing/demultiplexing component is a reflective grating component;
   the reflective grating component is configured to diverge a received beam into a plurality of single-wavelength optical signals along the dispersion direction, wherein the plurality of single-wavelength optical signals is processed by the cylindrical lens and then arrive at the LCOS; and
   the LCOS is configured to change transmission directions of the plurality of single-wavelength optical signals, and the plurality of single-wavelength optical signals with changed directions return along original optical paths to form the optical output signal.

6. The switch according to claim 5, wherein the reflective grating component comprises a prism and a diffraction grating.

7. The switch according to claim 1, wherein the multiplexing/demultiplexing component is a transmissive grating component; and
   the transmissive grating component is configured to diverge a received beam into a plurality of single-wavelength optical signals along a dispersion direction, wherein the plurality of single-wavelength optical signals are transmitted to the LCOS; and
   the LCOS is configured to change transmission directions of the plurality of single-wavelength optical signals, and the plurality of single-wavelength optical signals with changed directions return along original optical paths to form the optical output signal.

8. The switch according to claim 1, wherein the fiber cores of the reference optical fiber and the at least one other optical fiber are distributed in an arc shape in the height direction of the wavelength selective switch.

9. A reconfigurable optical add-drop multiplexer (ROADM) device, comprising at least one wavelength selective switch,
   wherein each of the at least one wavelength selective switch comprises:
   a plurality of optical fibers, configured to receive an optical input signal transmitted by a light source, wherein the plurality of optical fibers comprise a reference optical fiber and at least one other optical fiber, and a fiber core of each of the at least one other optical fiber has a first distance relative to a fiber core of the reference optical fiber in a height direction of the wavelength selective switch, the height direction is a direction perpendicular to a longitudinal axis of the plurality of optical fibers, and the height direction is a switching direction of a beam in the wavelength selective switch and is perpendicular to a dispersion direction of the beam;

a multiplexing/demultiplexing component, configured to split the optical input signal into a plurality of single-wavelength optical signals in space along the dispersion direction perpendicular to the height direction; and a liquid crystal on silicon (LCOS) including an array of pixels, wherein the LCOS is configured to:
receive the plurality of single-wavelength optical signals;
and
apply a voltage to a pixel in a location covered by each of the plurality of single-wavelength optical signals, and change a refractive index of a corresponding liquid crystal to change a phase of the single-wavelength optical signal so that an offset of a diffraction spectrum for the single-wavelength optical signal transmitted via the respective other optical fiber is compensated by the first distance of the respective other optical fiber, wherein the offset of the diffraction spectrum is an offset relative to a specified location of a center wavelength on the LCOS, and indicates how far the diffraction spectrum deviates from the specified location of the center wavelength on the LCOS, wherein the plurality of optical fibers is further configured to output an optical output signal obtained after the optical input signal is processed by the wavelength selective switch.

10. The ROADM device according to claim 9, wherein the offset of the diffraction spectrum for the reference optical fiber is 0 or the smallest among the offsets of the plurality of optical fibers.

11. The ROADM device according to claim 9, wherein the reference optical fiber is an optical fiber in the plurality of optical fibers other than an optical fiber of an offset that is 0 or the smallest among the offsets of the plurality of optical fibers, the fiber core of the reference optical fiber has a third distance relative to a fiber core of the optical fiber having the offset that is 0 or the smallest among the offsets of the plurality of optical fibers, and the offset of the diffraction spectrum for each of the at least one other optical fiber is equal to a sum of the first distance of the optical fiber and the third distance.

12. The ROADM device according to claim 9, wherein the wavelength selective switch further comprises a beam shaping and polarization splitting component, a curved reflector, and a cylindrical lens, wherein
the beam shaping and polarization splitting component is configured to collimate and shape the optical input signal, split a shaped beam into beams in orthogonal polarization states, and convert the beams in the orthogonal polarization states into two beams in a same polarization direction: a first beam and a second beam;
the curved reflector is configured to collimate and converge the first beam and the second beam in a dispersion direction, and send the first beam and the second beam to the cylindrical lens; and
the cylindrical lens is configured to collimate and converge the first beam and the second beam in the height direction, and send the first beam and the second beam to the multiplexing/demultiplexing component.

13. The ROADM device according the claim 12, wherein the multiplexing/demultiplexing component is a reflective grating component;
the reflective grating component is configured to diverge a received beam into a plurality of single-wavelength optical signals along the dispersion direction, wherein the plurality of single-wavelength optical signals is processed by the cylindrical lens and then arrive at the LCOS; and
the LCOS is configured to change transmission directions of the plurality of single-wavelength optical signals, and the plurality of single-wavelength optical signals with changed directions return along original optical paths to form the optical output signal.

14. The ROADM device according to claim 13, wherein the reflective grating component comprises a prism and a diffraction grating.

15. The ROADM device according the claim 9, wherein the multiplexing/demultiplexing component is a transmissive grating component; and
the transmissive grating component is configured to diverge a received beam into a plurality of single-wavelength optical signals along the dispersion direction, wherein the plurality of single-wavelength optical signals are transmitted to the LCOS; and
the LCOS is configured to change transmission directions of the plurality of single-wavelength optical signals, and the plurality of single-wavelength optical signals with changed directions return along original optical paths to form the optical output signal.

* * * * *